United States Patent [19]

Richter

[11] Patent Number: 5,465,932
[45] Date of Patent: Nov. 14, 1995

[54] FLEXIBLE TELEPHONE MOUNT

[76] Inventor: Gary L. Richter, 1485 Southern Way, Sparks, Nev. 89431

[21] Appl. No.: 37,237

[22] Filed: Mar. 25, 1993

[51] Int. Cl.$^6$ .................................................. F16M 13/00
[52] U.S. Cl. .......................... 248/160; 248/536; 403/4; 403/236; 403/261
[58] Field of Search .................... 248/160, 535, 248/536, 515, 518, 519, 207, 188; 403/4, 320, 261, 312, 236; 411/276, 277, 278, 279; 379/454

[56] References Cited

U.S. PATENT DOCUMENTS

| 235,106 | 12/1880 | Steiner | 248/515 |
| 448,550 | 3/1891 | Scott | 248/207 |
| 748,524 | 12/1903 | Pelton et al. | 379/454 |
| 939,439 | 11/1909 | Palmer | 379/454 |
| 1,464,082 | 8/1923 | Leo | 411/279 X |
| 1,501,998 | 7/1924 | Hanford et al. | 248/536 |
| 2,510,198 | 6/1950 | Tesmer | 248/274 |
| 2,597,670 | 5/1952 | Pinto | 248/122 |
| 2,822,228 | 2/1958 | Comer | 248/188 |
| 3,041,708 | 7/1962 | Holtz | 248/188 |
| 3,184,548 | 5/1965 | Krulwich | 248/121 |
| 3,826,155 | 7/1974 | Müller | 403/261 X |
| 4,836,485 | 6/1989 | Richter | 248/278 |
| 4,842,174 | 6/1989 | Sheppard et al. | 248/160 X |
| 5,118,058 | 6/1992 | Richter | 248/183 |
| 5,187,744 | 2/1993 | Richter | 379/449 |

*Primary Examiner*—Ramon O. Ramirez
*Assistant Examiner*—Korie H. Chan
*Attorney, Agent, or Firm*—Stetina Brunda & Buyan

[57] ABSTRACT

A flexible mounting assembly for mounting a telephone within an automobile has a base rigidly attachable to a support surface within the automobile, a head rigidly attachable to the telephone, and a flexible elongate member interconnecting the base and the head. Split-yoke clamps, each having a set screw, are utilized to effect attachment of the flexible elongate member to the base and head in a manner which substantially reduces the likelihood of loosening.

6 Claims, 2 Drawing Sheets

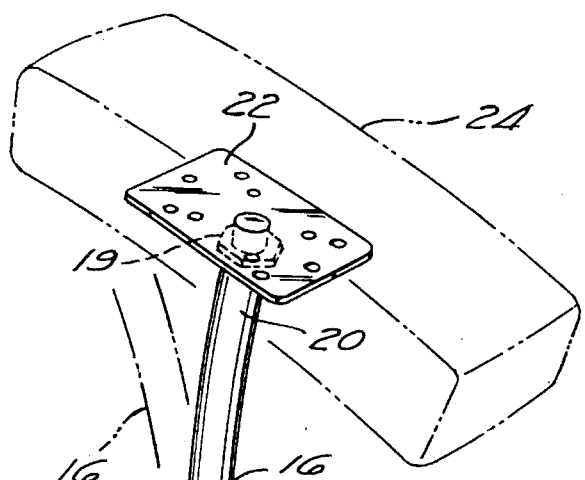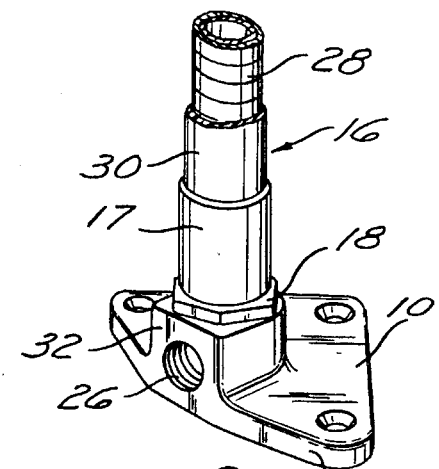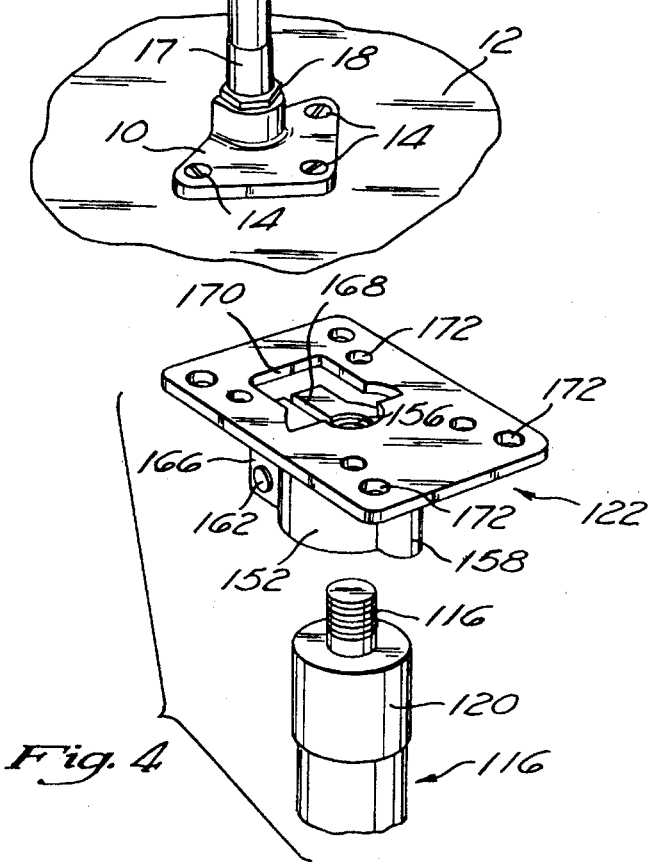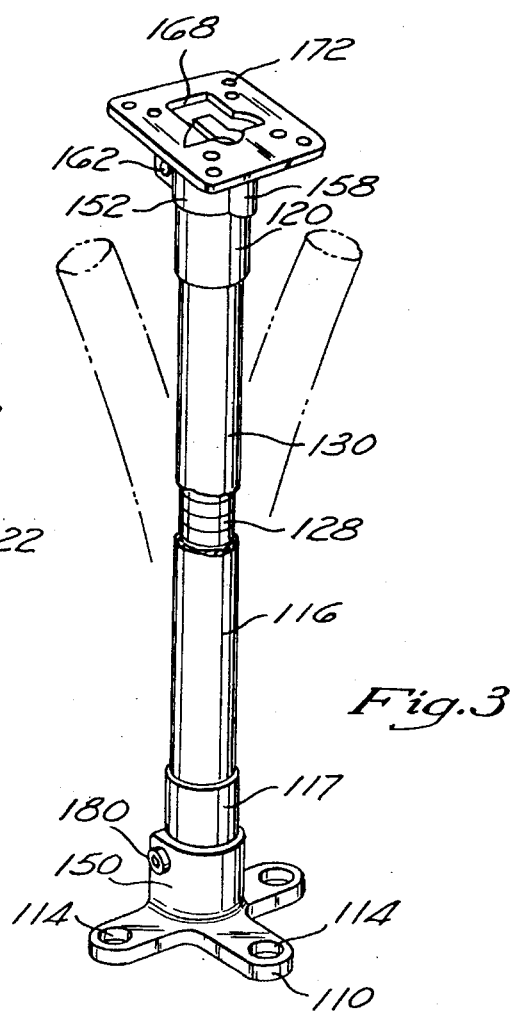

FLEXIBLE TELEPHONE MOUNT

FIELD OF THE INVENTION

The present invention relates to telephone mounting systems and more particularly to a flexible mounting assembly for mounting a telephone or like device within an automobile.

BACKGROUND OF THE INVENTION

Systems for mounting car telephones and the like are well known. Such mounting systems are either rigid or flexible in construction. Rigid mounting assemblies typically comprise a base which is attachable to a support surface, i.e., the floor, dashboard, fire wall, etc., of an automobile; a head plate to which the car telephone is attached; and a rigid elongate member interconnecting the base and head plate. The rigid elongate member is commonly attached to the base and head plate utilizing a universal-type joint so as to facilitate positioning of the mounted device as desired. Car telephones and other various devices, i.e. digital data transmission devices, etc., are commonly mounted in this manner.

Examples of such rigid mounting assemblies are disclosed in U.S. Pat. No. 4,836,485, issued on Jun. 6, 1989 to Cooper and in U.S. Pat. No. 5,118,058, issued on Jun. 2, 1992 to Richter, the contents of both of which are hereby incorporated by reference. Both patents disclose devices which utilize a rigid or non-flexible elongate member which interconnecting the base and the head. A universally adjustable joint attaches the mounting base to the rigid elongate interconnecting member and also attaches the rigid elongate interconnecting member to the head plate, to facilitate positioning of the mounted device as desired.

Such mounts are typically attached to the automobile via fasteners, i.e. screws, bolts, and nuts, etc., at a desired location. They are also attached to a telephone or other device in a similar manner. The elongate member and/or head plate are then oriented such that the telephone is positioned as desired and the universal joint set screw (Cooper) or knob (Richter) is tightened to maintain such positioning.

It is also known to use a flexible elongate shaft to obtain desired orientation and positioning of the mounted device. However, devices utilizing such a flexible elongate member attach the flexible elongate member to the base and head thereof via threaded male members formed upon both ends of the flexible elongate member and lock nuts disposed upon the threaded male members. Each threaded male member is threadably received into a complimentary female threaded member formed within the base and head. The lock nuts disposed upon the male threaded members are then tightened against the base and head to prevent loosening thereof.

However, repositioning of the mounted device, via bending of the flexible elongate shaft, tends to effect rotation of the threaded male members within the female threaded members, thus frequently causing loosening thereof. Once the threaded male member has loosened sufficiently to make the lock nut ineffective, the threaded male member is then free to loosen completely. Thus, such mounting assemblies do not mount devices such as telephones in a desirably secure manner.

As such, although the prior art has recognized to a limited extent the problem of adjustably mounting telephones and the like within an automobile, the preferred solutions have to date been ineffective in providing a satisfactory remedy.

SUMMARY OF THE INVENTION

The present invention specifically addresses and alleviates the above-mentioned deficiencies associated with the prior art. More particularly, the present invention comprises a flexible mounting assembly comprising a base rigidly attachable to a support surface such as the floor, fire wall, or dashboard of a vehicle; a head rigidly attachable to a mounted item such as a car telephone, data transmission device, etc.; and a flexible elongate member interconnecting the base and the head.

At least one of the base and head comprises a clamp and is attached to the flexible member via the clamp. The clamp is preferably a split-yoke type clamp having a set screw and is preferably formed as an integral portion of the base and/or head. The two ends of the flexible elongate member comprise either threaded or plain male members which are received by either threaded or plain female members formed within the base and head.

A slot is formed at the base of the split-yoke clamp of the head to facilitate clamping action thereof while maintaining the clamp in a low profile configuration. The split-yoke clamp of the base extends sufficiently outward from the flange thereof such that a similar slot is not required therein. The base and the head are preferably formed by die casting. An insert may be utilized when die casting the head to form the slot. Alternatively, the head may be die cast without a slot formed therein and the slot machined in after the die casting.

The base comprises a first bore formed perpendicular to the flange and second bore formed perpendicular to a second threaded bore. Either or both bores may optionally be threaded. A single split-yoke clamp formed in the base and has a set screw configured such that tightening the set screw results in tightening both the first and second bores to allow the flexible elongate member to be attached to the base by inserting one threaded or smooth, i.e., non-threaded, male member of the flexible elongate member therein.

Either of the male members of the flexible elongate member or any of the female members of either the base or head may optionally be formed in a smooth fashion, rather than having threads. The clamping force exerted by the split-yoke clamp is sufficient to rigidly capture a male member of the flexible elongate member whether or not threads are formed upon either the male member or within the bore.

These, as well as other, advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a prior art flexible telephone mount;

FIG. 2 is an enlarged perspective view of the base of the prior art flexible telephone mount of FIG. 1;

FIG. 3 is a perspective view of the flexible telephone mount of the present invention;

FIG. 4 is an enlarged perspective view of the distal end of the flexible elongate member and the head plate;

DETAILED DESCRIPTION OF THE PREFERRED EMBODIMENT

Figure 5:
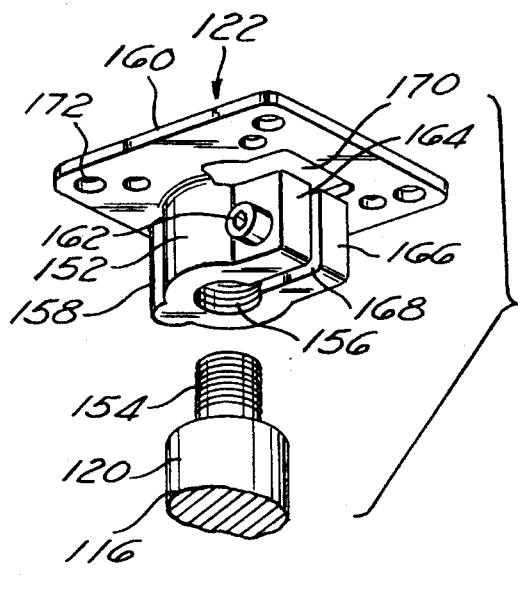
FIG. 5 is an enlarged perspective view of the distal end of the flexible elongate member and head plate of FIG. 4, rotated approximately 180 degrees.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The flexible telephone mount of the present invention is illustrated in FIGS. 3 through 8 which depict a presently preferred embodiment of the invention. FIGS. 1 and 2 illustrate a prior art flexible telephone mount.

Referring now to FIGS. 1 and 2, a prior art flexible telephone mount comprises a base 10 attachable to a support surface 12 via fasteners 14, such as screws, bolts, rivets, etc. A flexible elongate member 16 extends from the base 10 and is threadably attached at the proximal end 17 thereof to the base 10. Lock nut 18 is intended to prevent loosening of the flexible elongate member 16 relative to the base 10.

The distal end 20 of the flexible elongate member 16 similarly attaches to head plate 22. A car telephone 24 or like device is similarly attached to the head plate 22 via fasteners, i.e. bolts, screws, rivets, etc.

With particular reference to FIG. 2, the base plate 10 comprises two threaded apertures. A first threaded aperture 26 facilitates attachment of the flexible elongate member 16 generally in the plane of the base 10 and support surface 12, thereby facilitating mounting to generally vertical surfaces. A second threaded aperture (into which the flexible elongate member is threaded in FIG. 2) is formed perpendicular to the first threaded aperture 26 such that the flexible elongate member 16 is mountable generally perpendicular to the base 10 and support surface 12, thereby facilitating installation upon a generally horizontal support surface 12.

The first 26 and second (not shown) apertures are formed within a boss 32 formed upon a generally planar base 34.

The flexible elongate member 16 is comprised of a flexible conduit-like inner layer 28 surrounded by a flexible, i.e. rubber or plastic, coating or cover 30. Thus, the flexible elongate member 16 can be bent in order to position and orient the car telephone 24 or other device as desired.

Such prior art flexible telephone mounts suffer from the inherent disadvantage that, through repeated readjustment of the position of the telephone, the lock nut 18 is frequently caused to loosen sufficiently that the threaded male member at the proximal end of the flexible elongate member 16 begins to loosen as well. Once the lock nut 18 has loosened, the threaded male member is then free to loosen completely without restraint. That is, once the threaded coupling at the base 10 of prior art flexible telephone mounts begins to loosen, it is then free to loosen completely. A lock nut 19 similarly disposed at the distal end 20 of the flexible elongate member 16 may loosen in a similar manner and thereby result in loosening of the head plate 22.

Referring now to FIG. 3, a flexible telephone mount of the present invention is illustrated. As in the prior art, the flexible telephone mount of the present invention generally comprises a base 110 attachable to a substrate via fasteners inserted through apertures 114 formed within the base 110. A flexible elongate member 116 extends from the base 110 attached at the proximal end 117 thereof to a head plate 122 attached at the distal end 120 thereof. Also as in the prior art, the flexible elongate member 116 comprises a flexible conduit 128 inner layer covered with a flexible, i.e. rubber or plastic, outer layer 130.

However, in the flexible telephone mount of the present invention, the proximal 117 and distal 120 ends of the flexible elongate member 160 are attached to the base 110 and head plate 122, respectively, via split-yoke clamps. A first split-yoke clamp 150 attaches the proximal end of the flexible elongate member 116 to the base 110 and a second split-yoke clamp 152 attaches the distal end of the flexible elongate member 116 to the head plate 122.

Referring now to FIG. 5, the flexible elongate member 116 has a male threaded member 154 formed upon the distal end 120 thereof. The male threaded member 154 of the flexible elongate member 116 is received within a complimentary threaded bore 156 formed within the head plate 122. The bore 156 of the head plate 122 is formed in a raised portion or boss 158 formed upon a planar portion 160 thereof. The boss 153 is configured in a split-yoke clamp arrangement and has a set screw 162 threadably disposed therein for tightening of the split-yoke clamp. The split-yoke clamp comprises first 164 and second 166 legs which extend from the boss 158 and which have the set screw 162 extending therethrough.

A split 168 separates the first 164 and second 166 legs such that narrowing of the split 168 results in tightening of the split-yoke clamp 152 about the threaded male member 154 of the flexible elongate member 116. A cutout 170 defines a region wherein the boss 158, more particularly the first 164 and second 166 legs thereof, do not contact the planar base 160 of the head plate 122.

A plurality of apertures 172 formed in the planar base 160 facilitate attachment of the head plate 122 to a car telephone or the like.

Figure 6:
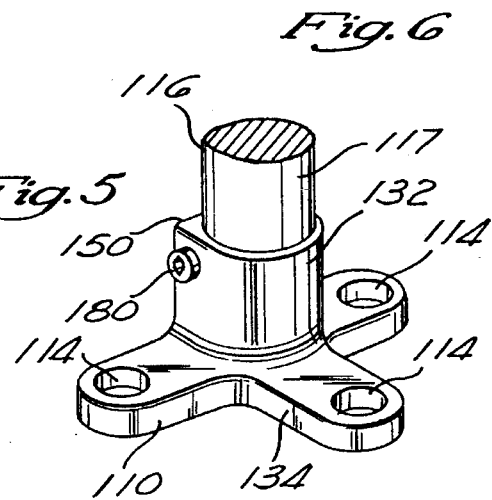
FIG. 6 is an enlarged perspective view of the base plate and proximal end of the flexible elongate member of FIG. 3 showing the base plate oriented for mounting to a generally horizontal surface.
Figure 7:
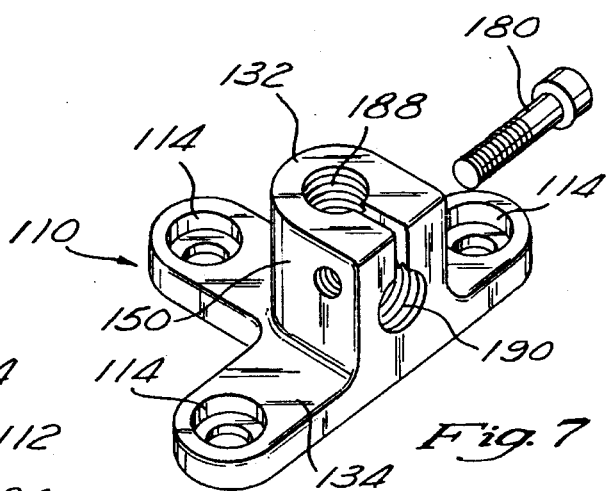
FIG. 7 is an enlarged perspective view of the base of FIGS. 3, 6, and 8.
Figure 8:
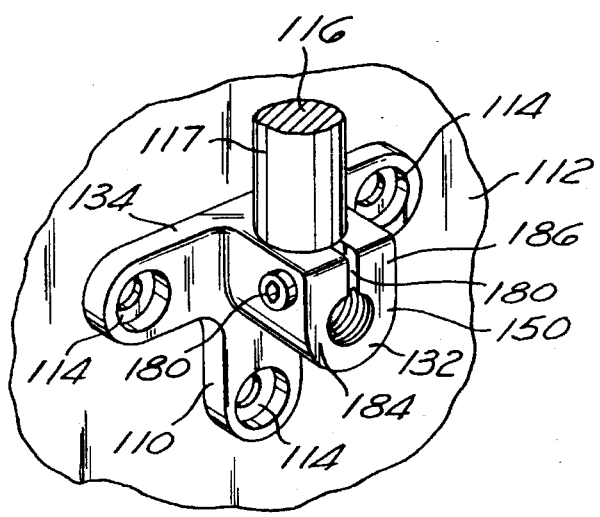
FIG. 8 is a perspective view of the base plate and proximal end of the flexible elongate member of FIG. 3 showing the base plate oriented for mounting to a generally vertical surface.

Referring now to FIGS. 6–8, the base 110 similarly comprises a split-yoke type clamp 150 formed in a boss 132. The boss is formed upon a planar support 134 having a plurality of mount apertures 114 formed therein. The split-yoke clamp 150 comprises a threaded bore which receives a threaded male member formed upon the proximal end of the flexible elongate member 116 in a manner similar to the that of the head plate 122. Likewise, set screw 180 facilitates tightening of the split-yoke clamp 150 about the threaded male member formed upon the proximal end 117 of the flexible elongate member 116. Split 182 is formed intermediate first 184 and second 186 legs formed as a portion of boss 132 to define the split-yoke clamp 150.

Both first 188 and second 190 bores extend through boss 132 such that the flexible elongate member 116 may be attached to the base 110 either parallel to the support surface 112 (as shown in FIG. 8) or perpendicular thereto (as shown in FIG. 1). Tightening of the set screw 180 results in drawing of the first 184 and second 186 legs together such that both the first 188 and second 190 bores will clamp about the threaded male member formed upon the proximal end 117 of the flexible elongate member 116 disposed therein.

Either the threaded male member 154 formed upon the distal end of the flexible elongate member 116; the threaded male member formed upon the proximal end 117 thereof; the threaded bore 156 of the head plate 122; and/or either of the first 188 or second 190 threaded bores may be formed without threads, i.e. smooth, as desired. That is, any combination of smooth or threaded male and/or female members may be utilized due to the effective clamping provided by the split-yoke type of attachment.

Having thus described the structure of the flexible telephone mount of the present invention, it may be beneficial to describe the use thereof. The base 110 is attached to a suitable support surface within the vehicle using fasteners such as screws, bolts, rivets, or the like. The car telephone or other device to be mounted is similarly attached to the head plate 122.

The flexible elongate member 116 is attached to the base 110 by inserting the male member formed upon the proximal end 117 thereof into either the first 188 or second 190 bore of the base 110, as desired. In a similar fashion, the head plate 122 is attached to the distal end 120 of the flexible elongate member.

If the male members and the bores are threaded, then the flexible elongate member 116 is screwed into the base 110 and head plate 122. However, if the bores and the male members of the flexible elongate member 116 are smooth, then the male members are merely inserted into the bores.

The set screw 180 of the base 110 and the set screw 162 of the head plate 122 are tightened to secure the base 110 and the head plate 122 to the flexible elongate member 116.

Next the flexible elongate member 116 is bent so as to position the car telephone or other device as desired. Since no lock nuts are utilized, twisting of the head plate 122 relative to the base plate 110 does not cause loosening of either the head plate 122 or the base plate 110 relative to the flexible elongate member 116. The flexible elongate member 116 remains firmly and rigidly engaged to the head plate 122 and the base plate 110 because of the secure clamping action of the split-yoke clamps 150 and 152.

It is understood that the exemplary flexible telephone mount described herein and shown in the drawings represents only a presently preferred embodiment of the invention. Indeed, various modifications and additions may be made to such embodiment without departing from the spirit and scope of the invention. For example, the male members formed upon the flexible elongate member and the corresponding bores formed within the head plate and base need not be round, but rather may be of various, i.e. square, triangular, hexagonal, octagonal, etc., configurations. Also, various shapes and configurations of the base, head plate, and elongate member are contemplated.

Thus, these and other modifications and additions may be obvious to those skilled in the art and may be implemented to adapt the present invention for use in a variety of different applications.

What is claimed is:

1. A flexible mount assembly for mounting a telephone within an automobile, said flexible mount assembly comprising:
   a) a flexible elongate member having first and second male members formed upon ends thereof;
   b) a base comprising:
      (i) a flange having a plurality of mounting apertures formed therein for utilizing fasteners to attach said base to a support surface within the automobile;
      (ii) a boss formed upon said base;
      (iii) a first bore formed in said boss perpendicular to said flange;
      (iv) a second bore formed in said boss perpendicular to said first bore;
      (v) a split-yoke clamp formed in said boss and having a set screw, said split-yoke clamp being configured such that tightening the set screw results in tightening both the first and second bores to allow the flexible elongate member to be attached to the base by inserting the flexible elongate member into either bore;
   c) a head comprising:
      (i) a flange having a plurality of mounting apertures formed therein for utilizing fasteners to attach said head to a telephone;
      (ii) a boss formed upon said flange;
      (iii) a bore formed in said boss perpendicular to said flange;
      (iv) a split-yoke clamp having a set screw formed in said body and configured such that tightening the set screw results in tightening of the bore about the second male member of said flexible elongate member; and
      (v) a slot formed in said body at the base of said clamp to facilitate clamping action thereof.

2. A mount assembly for mounting a telephone within an automobile, said mount assembly comprising:
   a) an elongate member having a male member formed upon at least one end thereof;
   b) a split-yoke clamp having first and second bores formed herein, the first and second bores formed at an angle relative to one another, the split-yoke clamp comprising a set screw and being configured such that tightening the set screw results in tightening both the first and second bores to facilitate attachment of the split-yoke clamp to at least one end of the elongate member; and
   c) a flange formed on said split-yoke clamp and configured to facilitate attachment thereof to a support surface with the automobile.

3. The mount assembly as recited in claim 2 wherein said elongate member comprises a flexible elongate member.

4. The mount assembly as recited in claim 2 wherein said elongate member comprises a male member formed upon both ends thereof.

5. The mount assembly as recited in claim 2 wherein said first and second bores formed generally perpendicular to one another.

6. A mount assembly comprising:
   (a) a base attachable to a support surface, said base having a first bore formed therein and a second bore form therein perpendicularly to said first bore;

(b) a head plate rigidly attachable to a mounted item;
(c) flexible elongate member interconnecting said base and said head plate;
(d) wherein said base includes a split-yoke clamp having a set screw, said clamp being configured such that tightening the set screw results in tightening both the first and second bores, to allow the flexible elongate member to be attached to the first and second bores of the base by mounting the elongate member into either bore.

* * * * *